United States Patent Office 3,149,115
Patented Sept. 15, 1964

3,149,115
PYRAZOLINONES AND METHOD OF PREPARING THE SAME
Herbert J. Brabander, Pearl River, N.Y., and William B. Wright, Jr., Woodcliff Lake, N.J., assignors to American Cyanamid Company, Stamford, Conn., a corporation of Maine
No Drawing. Filed Nov. 2, 1962, Ser. No. 235,125
9 Claims. (Cl. 260—268)

This invention relates to new organic compounds. More particularly, the invention relates to substituted pyrazolinones and method of preparing the same.

The novel compounds of the invention can be illustrated by the following structural formula:

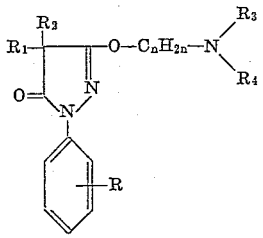

wherein R is selected from the group consisting of hydrogen, halogen, lower alkyl, lower alkoxy and trifluoromethyl, $R_1$ and $R_2$ are lower alkyl groups and when combined with the attached carbon atom form a cycloalkane of 3–6 carbons, $R_3$ is selected from the group consisting of lower alkyl, cycloalkyl, alkenyl, propargyl, and lower aralkyl, $R_4$ is lower alkyl, alkenyl and

when taken together is selected from the group consisting of piperidino, lower alkylpiperidino, morpholino, lower alkylmorpholino, pyrrolidino, lower alkylpyrrolidino, hexamethyleneimino, piperazinyl, lower alkylpiperazinyl and phenylpiperazinyl, lower acyloxy-lower alkylpiperazinyl, $n$ is an integer from 2 to 4 and acid addition and quaternary amonium salts.

The compounds of the present invention are, in general, relatively insoluble in water but soluble in organic solvents such as alcohols, ethers, chloroform and the like. The present compounds are basic and will therefore form acid addition salts with, for example, mineral acids. These salts are usually crystalline solids which are soluble in water and alcohol but relatively insoluble in ether, benzene, toluene and the like.

The compounds of this invention can be prepared by reacting a mixture of a 1-aryl-4,4-dialkyl-3,5-pyrazolidinedione and sodium hydride in diethyleneglycoldimethylether (diglyme) with a dialkylaminoalkyl halide. The compounds of this invention are characterized by strong bands in the infrared absorption spectrum at about 5.83μ and 6.16μ. These bands can be assigned to the C=O and C=N groups, respectively. The following equation represents the reaction which takes place.

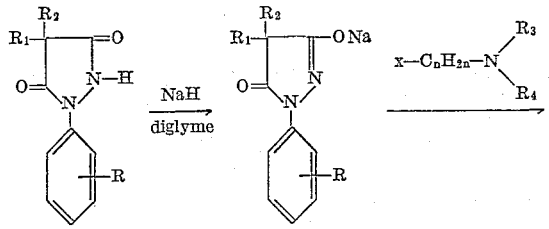

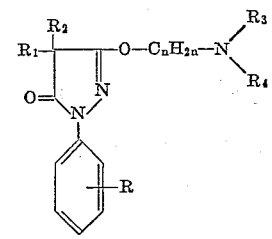

wherein R, $R_1$, $R_2$

$R_3$, $R_4$ and $n$ are as defined above. This reaction is usually carried out at a temperature within the range of 30° to 180° C. for a period of time ranging from about one hour to about eight hours.

Typical compounds prepared by the process of the invention include 6-(p-chlorophenyl)-8-(2-piperidinoethoxy)-6,7-diazaspiro [3,4]oct-7-en-5-one;
6-(p-chlorophenyl)-8-(2-morpholinoethoxy)-6,7-diazaspiro[3,4]oct-7-en-5-one;
6-(p-chlorophenyl)-8-(2-pyrrolidinoethoxy)-6,7-diazaspiro[3,4]oct-7-en-5-one;
6-(p-bromophenyl)-8-(2-piperidinoethoxy)-6,7-diazaspiro[3,4]oct-7-en-5-one;
6-(p-chlorophenyl)-8-[3-(4-methyl-1-piperazinyl)propoxy]-6,7-diazaspiro[3,4]oct-7-en-5-one;
6-(p-ethylphenyl)-8-(2-piperidinoethoxy)-6,7-diazaspiro [3,4]oct-7-en-5-one;
8-[3-(4-methyl-1-piperazinyl)propoxy]-6-phenyl-6,7-diazaspiro[3,4]oct-7-en-5-one;
4,4-diethyl-3-[3-(4-methyl-1-piperazinyl)propoxy]-1-phenyl-2-pyrazolin-5-one;
6-(m-chlorophenyl)-8-[3-(4-methyl-1-piperazinyl)propoxy]-6,7-diazaspiro[3,4]oct-7-en-5-one;
8-(3-dimethylaminopropoxy)-6-phenyl-6,7-diazaspiro [3,4]oct-7-en-5-one;
8-(4-dimethylaminobutoxy)-6-phenyl-6,7-diazaspiro[3,4] oct-7-en-5-one;
8-[3-(4-phenyl-1-piperazinyl)propoxy]-6-phenyl-6,7-diazaspiro[3,4]oct-7-en-5-one;
8-[3-(4-acetoxyethylpiperazinyl)propoxy]-6-phenyl-6,7-diazaspiro[3,4]oct-7-en-5-one;
6-(m-chlorophenyl)-8-(2-dimethylaminoethoxy)6,7-diazaspiro[3,4]oct-7-en-5-one;
6-(m-methoxyphenyl)-8-(2-dimethylaminoethoxy)-6,7-diazaspiro[3,4]oct-7-en-5-one;
6-(m-trifluoromethylphenyl)-8-[2-(2-methylpyrrolidino) ethoxy]-6,7-diazaspiro[3,4]oct-7-en-5-one;
8-(2-dimethylaminoethoxy)-6-phenyl-6,7-diazaspiro[3,4] oct-7-en-5-one;
6-(m-chlorophenyl)-8-[2-(2-methylpiperidino)ethoxy]-6,7-diazaspiro[3,4]oct-7-en-5-one;
6-(m-chlorophenyl)-8-(2-hexamethyleneiminoethoxy)-6,7-diazaspiro[3,4]oct-7-en-5-one;
6-(m-chlorophenyl)-8-(2-piperidinoethoxy)-6,7-diazaspiro[3,4]oct-7-en-5-one;
8-(2-diallylaminoethoxy)-6-(m-chlorophenyl)-6,7-diazaspiro[3,4]oct-7-en-5-one;
5-(p-chlorophenyl)-7-(2-piperidinoethoxy)-5,6-diazaspiro [2,4]hept-6-en-4-one;
7-(p-chlorophenyl)-9-(2-piperidinoethoxy)-7,8-diazaspiro [4,4]non-8-en-6-one;
8-(p-chlorophenyl)-10-(2-piperidinoethoxy)-8,9-diazaspiro[4,5]dec-9-en-7-one;

6-phenyl-8-(2-piperidinoethoxy)-6,7-diazaspiro[3,4]oct-7-en-5-one;

6-(p-chlorophenyl)-8-[2-(2,6-dimethylmorpholino)ethoxy]-6,7-diazaspiro[3,4]oct-7-en-5-one;

1-methyl-1-[2-(7-phenyl-8-oxo-6,7-diazaspiro[3,4]oct-5-en-5-yloxy)ethyl]piperindinium iodide;

6-(p-chlorophenyl)-8-(2-methylpropargylaminoethoxy)-6,7-diazaspiro[3,4]oct-7-en-5-one;

6-(p-chlorophenyl)-8-(2-benzylmethylaminoethoxy)-6,7-diazaspiro[3,4]oct-7-en-5-one;

6-(p-chlorophenyl)-8-(2-cyclohexylmethylaminoethoxy)-6,7-diazaspiro[3,4]oct-7-en-5-one; and 3-(diethylaminoethoxy)-4,4-diethyl-1-phenyl-2-pyrazolin-5-one.

The compounds of the present invention have central nervous system depressant properties and are therefore useful as tranquillizers and muscle relaxant drugs. They can be used in various pharmaceutical preparations such as capsules, tablets, pills and so forth which may contain various diluents necessary to compounding the formulations.

The following examples illustrate in detail the preparation of specific substituted diazaspiroalkanes of the present invention.

EXAMPLE I

*Preparation of 6-(p-Chlorophenyl)-8-(2-Piperidinoethoxy)-6,7 - Diazaspiro[3,4]Oct-7-En-5-One Hydrochloride*

Four parts of 6-(p-chlorophenyl)-6,7-diazaspiro[3,4]octane-5,8-dione in 75 parts of diglyme is added to one part of 50% sodium hydride (in mineral oil) in 75 parts of diglyme and the mixture is stirred at room temperature for 30 minutes. A solution of 2.8 parts of 2-piperidinoethyl chloride in 200 parts of ether is added and the reaction mixture is stirred for one hour. The mixture is warmed so that the ether distills off and is then heated at reflux temperature for five hours. The precipitate is filtered off and the mother liquor is concentrated to remove the diglyme. The residue is mixed with 25 parts of water and the oil is extracted into ether. The ether layer is dried over magnesium sulfate and 18 parts of 1.8 N ethanolic hydrogen chloride are added. The hydrochloride salt which separates is filtered and recrystallized. The desired product, melting point 191–193° C., is obtained in 82% yield.

EXAMPLE II

*Preparation of 6-(p-Chlorophenyl)-8-(2-Morpholinoethoxy)- 6,7 - Diazaspiro[3,4]Oct-7-En-5-One Hydrochloride*

The above compound, melting point 215–217° C., is obtained in 70% yield when 2-morpholinoethyl chloride is substituted for 2-piperidinoethyl chloride in the process of Example I.

EXAMPLE III

*Preparation of 6-(p-Chlorophenyl)-8-(2-Pyrrolidinoethoxy)- 6,7 - Diazaspiro[3,4]Oct-7-En-5-One Hydrochloride*

The above compound is obtained when 2-pyrrolidinoethyl chloride is substituted for 2-piperidinoethyl chloride in the procedure of Example I.

EXAMPLE IV

*Preparation of 6 - (p-Bromophenyl)-8-(2-Piperidinoethoxy) - 6,7 - Diazaspiro[3,4]Oct - 7 - En - 5 - One Hydrochloride*

When 6-(p-bromophenyl)-6,7-diazaspiro-[3,4]octane-5,8-dione is substituted for 6-(p-chlorophenyl)-6,7-diazaspiro[3,4]octane-5,8-dione in the process of Example I, the above product is obtained.

EXAMPLE V

*Preparation of 6 - (p-Chlorophenyl)-8-[3-(4-Methyl-1-Piperazinyl) Propoxy]-6,7-Diazaspiro[3,4]Oct-7-En-5-One Dihydrochloride*

The above compound, melting point 231–233° C., is obtained in 61% yield when 3-(4-methyl-1-piperazinyl) propyl chloride is substituted for 2-piperidinoethyl chloride in the procedure of Example I.

EXAMPLE VI

*Preparation of 6-(p-Ethylphenyl) - 8 - (2-Piperidinoethoxy) - 6,7 - Diazaspiro[3,4]Oct - 7 - En - 5 - One Hydrochloride*

The above compound is obtained when 6-(p-ethylphenyl)-6,7-diazaspiro[3,4]octane-5,8-dione is substituted for 6 - (p-chlorophenyl) - 6,7-diazaspiro[3,4]octane-5,8 - dione in the procedure of Example I.

EXAMPLE VII

*Preparation of 8-[3-(4-Methyl-1-Piperazinyl)Propoxy]-6-Phenyl - 6,7 - Diazaspiro[3,4]Oct - 7 - En - 5 - One Dihydrochloride*

One-half part of 50% sodium hydride (in mineral oil) in 30 parts of diglyme is treated with 2.2 parts of 6-phenyl-6,7-diazaspiro[3,4]octane-5,8-dione dissolved in 75 parts of diglyme. To this reaction mixture is added 1.8 parts of 1-(3-chloropropyl)-4-methylpiperazine in 30 parts of diglyme. The mixture is heated at reflux temperature for four hours. The reaction mixture is filtered and the filtrate is concentrated to an oil. The oil is mixed with 25 parts of water, extracted with chloroform and ether and the organic layer is concentrated to a viscous oil. When this oil is dissolved in ethanol and treated with ethanolic hydrogen chloride, 8 - [3 - (4 - methyl-1-piperazinyl)propoxy]-6-phenyl-6,7-diazaspiro[3,4]oct-7-en-5-one dihydrochloride is obtained. Recrystallization gives a yield of 46% of the identified compound, melting point 214–215° C.

EXAMPLE VIII

*Preparation of 4,4-Diethyl-3-[3-(4-Methyl-1-Piperazinyl) Propoxy]-1-Phenyl-2-Pyrazolin-5-One Dihydrochloride*

The above compound, melting point 217–220° C., is obtained when 4,4-diethyl-1-phenyl-3,5-pyrazolidinedione is substituted for 6-phenyl-6,7-diazaspiro[3,4]octane-5,8-dione in the process of Example VII.

EXAMPLE IX

*Preparation of 6 - (m-Chlorophenyl) - 8-[3(4-Methyl-1-Piperazinyl)Propoxy] - 6,7 - Diazaspiro[3,4]-Oct-7-En-5-One Dihydrochloride*

The above compound, melting point 229–231° C., is obtained when 6 - (m-chlorophenyl)-6,7-diazaspiro[3,4] octane-5,8-dione is substituted for 6-phenyl-6,7-diazaspiro [3,4]octane-5,8-dione in the process of Example VII.

EXAMPLE X

*Preparation of 8 - (3-Dimethylaminopropoxy)-6-Phenyl-6,7-Diazaspiro[3,4]Oct-7-En-5-One Hydrochloride*

The above compound is obtained when 3-dimethylaminopropyl chloride is substituted for 1-(3-chloropropyl) 4-methylpiperazine in the procedure of Example VII.

EXAMPLE XI

*Preparation of 8 - (4-Dimethylaminobutoxy)-6-Phenyl-6, 7-Diazaspiro[3,4]Oct-7-En-5-One Hydrochloride*

When 4-dimethylaminobutyl chloride is substituted for 1-(3-chloropropyl)-4-methylpiperazine in the process of Example VII, the above compound is obtained.

EXAMPLE XII

Preparation of 8 - [3-(4-Phenyl-1-Piperazinyl)Propoxy] 6 - Phenyl - 6,7 - Diazaspiro[3,4]Oct - 7 - En - 5 - One Dihydrochloride This compound is obtained when 1-(3-chloropropyl)-4-phenylpiperazine is substituted for 1-(3-chloroprogryl)-4-methylpiperazine in the procedure of Example VII.

EXAMPLE XIII

Preparation of 8-[3-(4-Acetoxyethylpiperazinyl)Propoxy] 6 - Phenyl - 6,7 - Diazaspiro[3,4]Oct - 7 - En - 5 - One Dihydrochloride When 1 - (acetoxyethyl)-4-(3-chloropropyl)-piperazine is substituted for the 1-(3-chloropropyl)-4-methyl piperazine in the procedure of Example VII, the above compound is obtained.

EXAMPLE XIV

Preparation of 6-(m-Chlorophenyl)-8-(2-Dimethylaminoethoxy) - 6,7 - Diazaspiro[3,4]Oct - 7 - En - 5 - One Hydrochloride A solution of 4 parts of 2-dimethylaminoethyl chloride in 150 parts of ether is added dropwise to a mixture of 1.5 parts of 50% sodium hydride (in mineral oil) and 7.5 parts of 6-(m-chlorophenyl)-6,7-diazaspiro [3,4]octane-5,8-dione in 300 parts of diglyme. The reaction mixture is stirred for one hour and then warmed so that the ether distills off. The mixture is heated at reflux temperature for seven hours, cooled, and filtered. The mother liquor is concentrated to remove the diglyme and the residue is diluted with 25 parts of water and the oil is extracted into ether. The ether layer is dried over magnesium sulfate and 17 parts of 1.8 N ethanolic hydrogen chloride are added. The precipitate is filtered off and recrystallized. A 58% yield of product melting at 192–194° C. is obtained.

EXAMPLE XV

Preparation of 6-(m-Methoxyphenyl)-8-(2-Dimethylaminoethoxy)-6,7-Diazaspiro[3,4]Oct-7-En-5-One Hydrochloride The above compound is obtained when 6-(m-methoxyphenyl)-6,7-diazaspirol[3,4]octane-5,8-dione is substituted for 6-(m-chlorophenyl)-6,7-diazaspiro[3,4]octane-5,8-dione in the procedure of Example XIV.

EXAMPLE XVI

Preparation of 6-(m-Trifluoromethylphenyl) - 8 - [2-(2-Methylpyrrolidino)Ethoxy] -6,7 - Diazaspiro[3,4]Oct-7-En-5-One Hydrochloride The above compound is obtained when 6-(m-trifluoromethylphenyl)-6,7-diazaspiro[3,4]octane - 5,8 - dione is substituted for 6-(m-chlorophenyl)-6,7-diazaspiro[3,4]-octane-5,8-dione and 2-(2-methylpyrrolidino)ethyl chloride is substituted for 2-dimethylaminoethyl chloride in the procedure of Example XIV.

EXAMPLE XVII

Preparation of 8-(2-Dimethylaminoethoxy)-6-Phenyl-6,7-Diazaspiro[3,4]Oct-7-En-5-One Hydrochloride The above product, melting point 172–175° C., is obtained when 6-phenyl - 6,7 - diazaspiro [3,4]octane-5,8-dione is substituted for 6-(m-chlorophenyl)-6,7-diazaspiro-[3,4]octane-5,8-dione in the procedure of Example XIV.

EXAMPLE XVIII

Preparation of 6-(m-Chlorophenyl)-8-[2-(2-Methylpiperidino)Ethoxy]-6,7-Diazaspiro[3,4]Oct-7-En-5-One Hydrochloride The above compound is obtained when 2-(2-methylpiperidino)ethyl chloride is substituted for 2-dimethylaminoethyl chloride in the procedure of Example XIV.

EXAMPLE XIX

Preparation of 6-(m-Chlorophenyl)-8-(2-Hexamethylene-Iminoethoxy)-6,7-Diazaspiro[3,4]Oct-7-En-5-One Hydrochloride The above compound is obtained when 2-hexamethyleneiminoethyl chloride is substituted for 2-dimethylaminoethyl chloride in the process of Example XIV.

EXAMPLE XX

Preparation of 6-(m-Chlorophenyl)-8-(2-Piperidinoethoxy)-6,7-Diazaspiro[3,4]Oct-7-En-5-One Hydrochloride The above compound, melting point 192–194°, is obtained in 46% yield when 2-piperidinoethyl chloride is substituted for 2-dimethylaminoethyl chloride in the procedure of Example XIV.

EXAMPLE XXI

Preparation of 8-(2-Diallylaminoethoxy) - 6 - (m-Chlorophenyl)-6,7-Diazaspiro[3,4]Oct-7-En - 5 - One Hydrochloride This compound is obtained by the procedure of Example XIV when 2-diallylaminoethyl chloride is substituted for 2-dimethylaminoethyl chloride.

EXAMPLE XXII

Preparation of 5-(p-Chlorophenyl) - 7 - (2-Piperidinoethoxy)-5,6-Diazaspiro[2,4]Hept-6-En-4-One Hydrochloride This compound is obtained when 5-(p-chlorophenyl)-5,6-diazaspiro[2,4]heptane-4,7-dione is substituted for 6-(p-chlorophenyl)-6,7-diazaspiro[3,4]octane - 5,8 - dione in the process of Example I.

EXAMPLE XXIII

Preparation of 7-(p-Chlorophenyl) - 9 - (2-Piperidinoethoxy)-7,8-Diazaspiro[4,4]Non-8-En-6-One Hydrochloride This compound is obtained when 7-(p-chlorophenyl)-7,8-diazaspiro[4,4]nonane-6,9-dione is substituted for 6-(p-chlorophenyl)-6,7-diazaspiro[3,4]octane-5,8-dione in the process of Example I.

EXAMPLE XXIV

Preparation of 8-(p-Chlorophenyl)-10-(2-Piperidinoethoxy)-8,9-Diazaspiro[4,5]Dec-9-En-7-One Hydrochloride This compound is obtained when 8-(p-chlorophenyl)-8,9-diazaspiro[4,5]decane-7,10-dione is substituted for 6-(p-chlorophenyl)-6,7-diazaspiro[3,4]octane-5,8-dione in the process of Example I.

EXAMPLE XXV

Preparation of 6-Phenyl-8-(2-Piperidinoethoxy)-6,7-Diazaspiro[3,4]Oct-7-En-5-One Hydrochloride This compound, melting point 192–194° C., is obtained when 6-phenyl-6,7-diazospiro[3,4]octane-5,8-dione is substituted for 6-(p-chlorophenyl)-6,7-diazaspiro[3,4]octane-5,8-dione in the procedure of Example I.

EXAMPLE XXVI

Preparation of 6-(p-Chlorophenyl)-8-[2-(2,6-Dimethylmorpholino)Ethoxy] - 6,7 - Diazaspiro[3,4]Oct-7-En-5-One Hydrochloride This compound is obtained when 2-(2,6-dimethylmorpholino)ethyl chloride is substituted for 2-piperidinoethyl chloride in the procedure of Example I.

EXAMPLE XXVII

Preparation of 1-Methyl-1-[2-(7-Phenyl-8-Oxo-6,7-Diazaspiro[3,4]Oct-5-En-5-Yloxy)Ethyl]Piperidinium Iodide Three parts of 6-phenyl-8-(2-piperidinoethoxy)-6,7-diazaspiro[3,4]oct-7-en-5-one are dissolved in ether and three parts of methyl iodide are added. The mixture is allowed to stand at 25° C. for seven days and the precipitate which forms is filtered off and recrystallized. The desired produce melts at 183–184° C.

EXAMPLE XXVIII

*Preparation of 6-(p-Chlorophenyl)-8-(2-Methylpropargylaminoethoxy) - 6,7 - Diazaspiro[3,4]Oct - 7 - En-5-One Hydrochloride*

The above compound is obtained when 2-methylpropargylaminoethyl chloride is substituted for 2-piperidinoethyl chloride in the procedure of Example I.

EXAMPLE XXIX

*Preparation of 6-(p-Chlorophenyl)-8-(2-Benzylmethylaminoethoxy)-6,7-Diazaspiro[3,4]Oct-7-En-5-One Hydrochloride*

The above compound is obtained when 2-benzylmethylaminoethyl chloride is substituted for 2-piperidinoethyl chloride in the procedure of Example I.

EXAMPLE XXX

*Preparation of 6-(p-Chlorophenyl)-8-(2-Cyclohexylmethylaminoethoxy)-6,7-Diazaspiro[3,4]Oct-7-En-5-One Hydrochloride*

The above compound is obtained when 2-cyclohexylmethylaminoethyl chloride is substituted for 2-piperidinoethyl chloride in the process of Example I.

EXAMPLE XXXI

*Preparation of 3-(Diethylaminoethoxy)-4,4-Diethyl-1-Phenyl-2-Pyrazolin-5-One Hydrochloride*

This compound, melting point 165–166° C., is prepared by the procedure of Example XIV. 4,4-diethyl-1-phenyl-3,5-pyrazolidinedione is substituted for 6-(m-chlorophenyl) - 6,7 - diazaspiro[3,4]octane-5,8-dione and 2-diethylaminoethyl chloride is substituted for the 2-dimethylaminoethyl chloride.

We claim:
1. A compound of the formula:

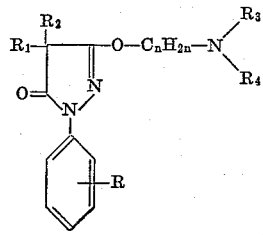

wherein R is selected from the group consisting of hydrogen, halogen, lower alkyl, lower alkoxy and trifluoromethyl, $R_1$ and $R_2$ are lower alkyl groups and when combined with the attached carbon atom form a cycloalkane of 3 to 6 carbons, $R_3$ is selected from the group consisting of lower alkyl, cycloalkyl, allyl, propargyl and benzyl, $R_4$ is selected from the group consisting of lower alkyl and allyl,

is selected from the group consisting of piperidino, lower alkylpiperidino, morpholino, lower alkylmorpholino, pyrrolidino, lower alkylpyrrolidino, hexamethyleneimino, piperazinyl, lower alkylpiperazinyl, phenylpiperazinyl and lower alkanoyloxy-lower alkylpiperazinyl, $n$ is an integer from 2 to 4 and physiologically acceptable acid addition and lower alkyl quaternary ammonium salts.

2. The compound 6-(p-chlorophenyl)-8-[3-(4-methyl-1-piperazinyl)propoxy] - 6,7 - diazaspiro[3,4]oct-7-en-5-one.

3. The compound 8-(2-dimethylaminoethoxy)-6-phenyl-6,7-diazaspiro[3,4]oct-7-en-5-one.

4. The compound 8-[3-(4-methyl-1-piperazinyl)propoxy]-6-phenyl-6,7-diazaspiro[3,4]oct-7-en-5-one.

5. The compound 6-(m-chlorophenyl)-8-[3-4-methyl-1-piperazinyl)propoxy]-6,7-diazaspiro[3,4]oct-7-en-5-one.

6. The compound 6-(m-chlorophenyl)-8-(2-dimethylaminoethoxy)-6,7-diazaspiro[3,4]oct-7-en-5-one.

7. The compound 3-(diethylaminoethoxy)-4,4-diethyl-1-phenyl-2-pyrazolin-5-one.

8. The compound 1-methyl-1-[2-(7-phenyl-8-oxo-6,7-diazaspiro[3,4]oct - 5 - en - 5 - yloxy)ethyl]piperidinium iodide.

9. The compound 6-(m-chlorophenyl)-8-(2-piperidinoethoxy)-6,7-diazaspiro[3,4]oct-7-en-5-one.

References Cited in the file of this patent

UNITED STATES PATENTS

| | | |
|---|---|---|
| 2,865,922 | Jucker et al. | Dec. 23, 1958 |
| 2,903,460 | Jucker et al. | Sept. 8, 1959 |
| 2,959,593 | Jucker et al. | Nov. 8, 1960 |

OTHER REFERENCES

Fieser et al.: Advanced Organic Chemistry, page 433, Reinhold Publishing Corp., New York (1961).

Cram et al.: Organic Chemistry, pp. 221–222, McGraw-Hill Book Co., Inc., New York (1959).